(12) United States Patent
Wilkinson

(10) Patent No.: US 6,842,138 B1
(45) Date of Patent: Jan. 11, 2005

(54) TARGET DESIGNATION SYSTEM

(75) Inventor: James A. Wilkinson, Ventura, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/666,127

(22) Filed: Sep. 22, 2003

Related U.S. Application Data

(63) Continuation-in-part of application No. 10/621,034, filed on Jul. 17, 2003, now Pat. No. 6,762,710, which is a continuation-in-part of application No. 10/219,383, filed on Aug. 12, 2002, now Pat. No. 6,650,277.

(51) Int. Cl.$^7$ .............................. F41G 7/00; F41G 9/00
(52) U.S. Cl. ............................. 342/62; 342/42; 342/43; 342/45; 342/61; 244/3.1; 244/3.11; 244/3.14
(58) Field of Search .......................... 372/109; 348/164; 434/2; 340/870.18; 42/115; 356/5.04, 151; 244/3.1–3.3; 342/42–45, 51, 61–65, 385; 89/1.11, 41.03, 41.17

(56) References Cited

U.S. PATENT DOCUMENTS

| | | | | |
|---|---|---|---|---|
| 3,750,163 A | * | 7/1973 | Hecker ........................ 342/45 |
| 3,800,440 A | * | 4/1974 | Membrino et al. ............ 434/2 |
| 3,944,928 A | * | 3/1976 | Augenblick et al. ... 340/870.18 |
| 4,028,991 A | * | 6/1977 | Kuby ........................ 89/41.03 |
| 4,047,117 A | * | 9/1977 | Tuchyner et al. .......... 244/3.16 |
| 4,091,412 A | * | 5/1978 | Salonimer .................. 244/3.16 |
| 4,179,088 A | * | 12/1979 | French ...................... 244/3.19 |
| 4,259,009 A | * | 3/1981 | Jernigan ................... 244/3.16 |
| 4,349,838 A | * | 9/1982 | Daniel ....................... 244/3.16 |
| 4,738,044 A | * | 4/1988 | Osterhout .................... 42/115 |
| 4,916,713 A | * | 4/1990 | Gerber ....................... 372/109 |
| 5,007,736 A | * | 4/1991 | Daniel et al. .............. 244/3.16 |
| 5,142,288 A | * | 8/1992 | Cleveland .................... 342/45 |
| 5,473,331 A | * | 12/1995 | Kennedy et al. ............. 342/62 |
| 5,568,152 A | * | 10/1996 | Janky et al. ............... 89/41.17 |
| 5,651,512 A | * | 7/1997 | Sand et al. ................ 244/3.11 |
| 5,685,504 A | * | 11/1997 | Schneider et al. ......... 244/3.11 |
| 5,745,575 A | * | 4/1998 | Otto et al. .................... 342/45 |
| 5,748,138 A | * | 5/1998 | Telle et al. ................... 342/45 |
| 5,990,939 A | * | 11/1999 | Sand et al. ................. 348/164 |
| 6,025,795 A | * | 2/2000 | Hulderman et al. .......... 342/45 |
| 6,515,737 B2 | * | 2/2003 | Perry ........................ 356/5.04 |
| 6,650,277 B1 | * | 11/2003 | Wilkinson .................... 342/62 |
| 6,762,710 B2 | * | 7/2004 | Wilkinson .................... 342/62 |

* cited by examiner

Primary Examiner—Bernarr E. Gregory
(74) Attorney, Agent, or Firm—David S. Kalmbaugh

(57) ABSTRACT

A target designation system for indicating a target to be destroyed by remotely guided ordnance comprising a receiver arranged to produce a receiver output signal in response to an incident electromagnetic signal from an attack aircraft. An auto-switch is connected to the receiver and arranged to produce a power signal in response to the receiver output signal. A transmitter is connected to the auto-switch to be activated by the power signal. When activated, the transmitter transmits a homing signal that indicates its location or the location of the target.

20 Claims, 2 Drawing Sheets

TARGET DESIGNATION SYSTEM

This application is a continuation-in-part of U.S. patent application Ser. No. 10/621,034, filed Jul. 17, 2003, now U.S. Pat. No. 6,762,710 which is a continuation-in-part of U.S. patent application Ser. No. 10/219,383, filed Aug. 12, 2002 now U.S. Pat. No. 6,650,277.

BACKGROUND OF THE INVENTION

1. Field of the Invention

This invention relates generally to systems for designating targets for destruction by aircraft bombardment. This invention relates particularly to systems for directing "smart" bombs to specific targets.

2. Description of the Prior Art

Remotely guided ordnance currently employs ground or airborne target designators that involve placing personnel and equipment in danger. Present target designation systems are hampered because intelligence on target position and target value can be out of date or simply not sufficiently accurate to avoid wasting valuable ordnance and/or causing unnecessary collateral damage.

SUMMARY OF THE INVENTION

The present invention is directed to a target designation system that overcomes the foregoing problems. A target designation system, according to the present invention for indicating a target to be destroyed by remotely guided ordnance such as a smart bomb, comprises a receiver arranged to produce a receiver output signal in response to an incident electromagnetic signal from an attack aircraft, an auto-switch arranged to produce a power signal in response to the receiver output signal and a transmitter connected to the auto-switch to be selectively activated and deactivated by the power signal. When activated, the transmitter transmits a homing signal that indicates its location so that ordnance may be delivered to the target.

The target designation system includes a decoder/memory circuit connected between the receiver and the auto-switch. The decoder/memory circuit is arranged to produce an activation signal that selectively turns the auto-switch ON and OFF when the incident electromagnetic signal has a predetermined frequency and is encoded with a preset code.

The target designation system further comprises an electrical power source connected to the receiver via a manual switch. The manual switch is also connected to the decoder/memory circuit to provide electrical power thereto.

The target designation system further comprises a motion sensor connected to the manual switch and arranged to produce a destruct signal in response to motion of the target designation system. The target designation system has an anti-compromise circuit connected to the motion sensor and arranged to destroy the target designation system in response to the destruct signal. The target designation system also further comprises a power ON delay circuit connected between the motion sensor and the manual switch. The power ON delay circuit is arranged to provide a selected power ON delay time between when the manual switch is turned ON and electrical power is applied to the motion detector.

The target designation system also comprises an auto-destruct delay circuit connected between the auto-switch and the anti-compromise circuit. The auto-destruct delay circuit is arranged to activate the anti-compromise circuit after a preset auto-destruct delay time from when the auto-switch was turned on.

The target designation system has a push-to-test switch which allows for testing and manual alignment of the target designation system with its intended target, when the system is deployed at or in proximity with a target to be destroyed.

DETAILED DESCRIPTION OF THE INVENTION

Figure 1:
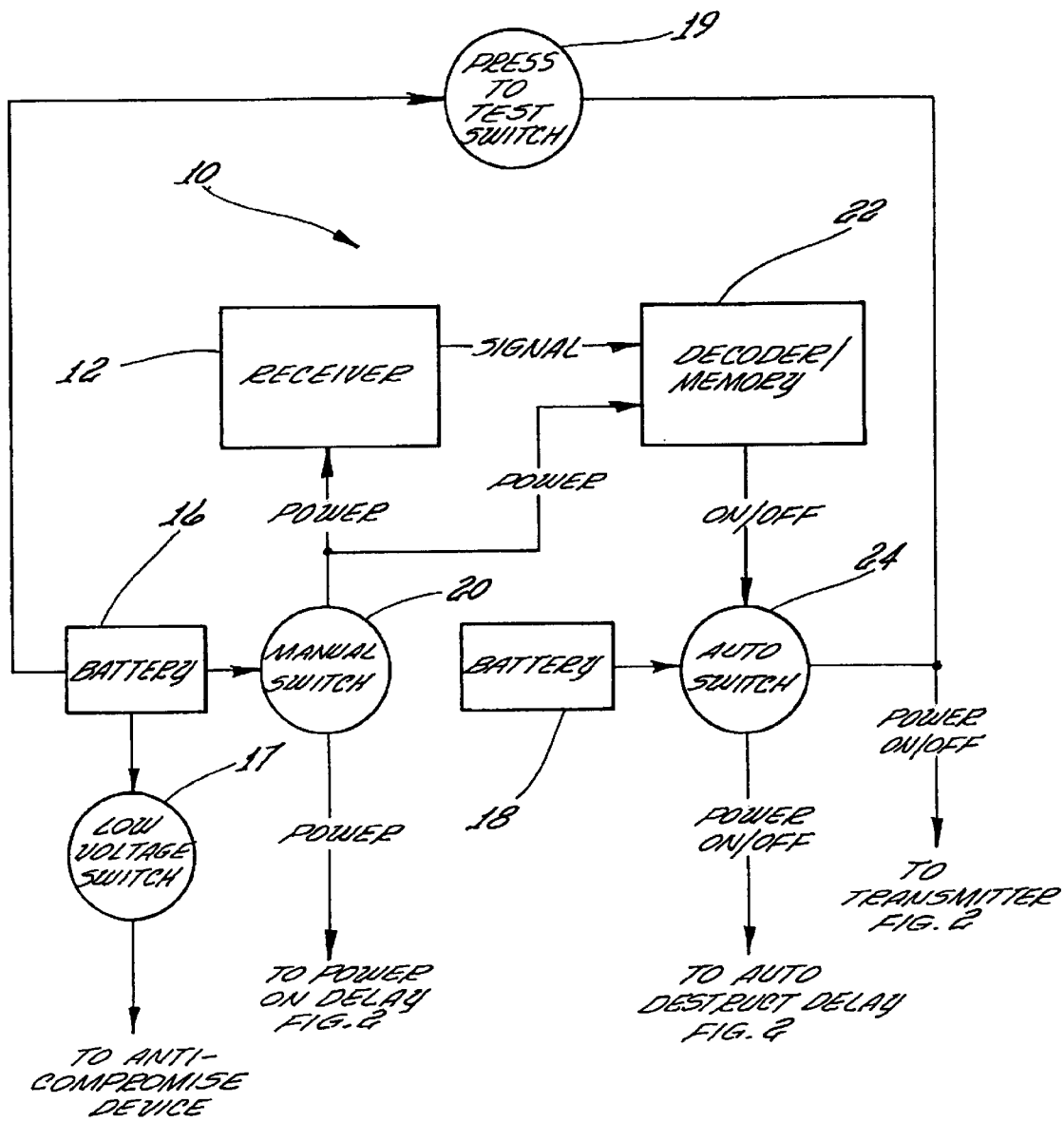
FIGS. 1 and 2 together illustrate a circuit block diagram of a target designation system according to the present invention.
Figure 2:
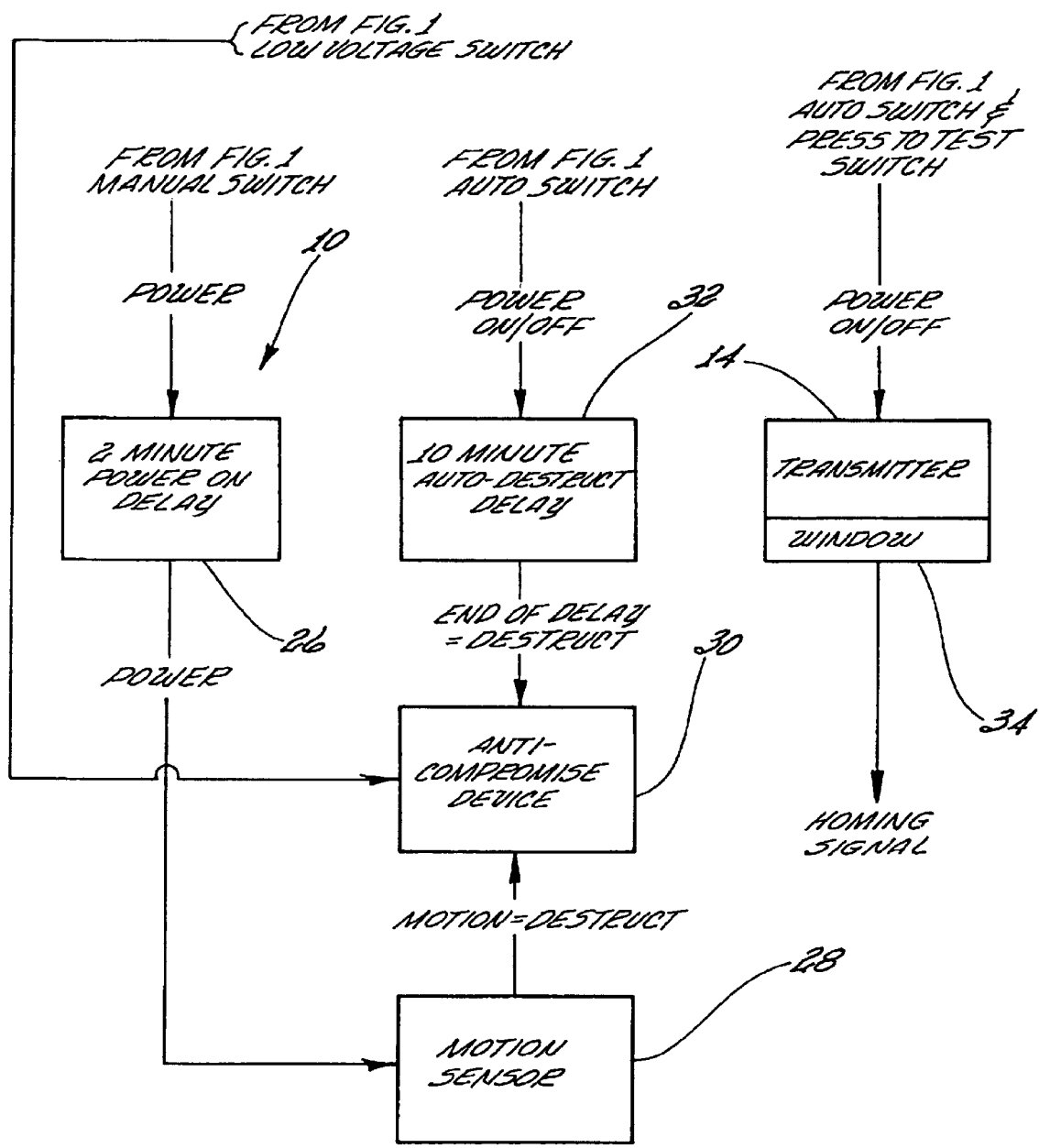

As shown in FIGS. 1 and 2, a target designation system 10 includes a receiver 12 and a transmitter 14. A battery 16 is arranged to serve as an electrical power source for receiver 12. A battery 18 is arranged to serve as an electrical power source for transmitter 14.

Referring to FIG. 1, a switch 20 that is manually operated is connected between receiver 12 and battery 16. Switch 20 also is connected between a decoder/memory circuit 22 and battery 16. When switch 20 is manually switched ON, electrical power from battery 16 is supplied to receiver 12 and decoder/memory circuit 22.

Receiver 12 is arranged to produce an output signal in response to an intercepted electromagnetic radio-frequency (RF) signal. The electromagnetic carrier signal must have a predetermined frequency and must contain a sub-carrier which is uniquely encoded and valid for only one target designation system. Each target designation system 10 has its own code which is use to activate the system.

The receiver output signal is input to a decoder/memory circuit 22 that may be either a separate component as shown or, alternatively, integral to receiver 12. If the receiver output includes the correctly encoded signal for the specific target designation system, the decoder/memory circuit 22 produces an activation signal that is applied to switch 24. Switch 24 is an auto-switch that operates in response to the activation signal from decoder/memory circuit 22. Switch 24 is connected between battery 18 and transmitter 14 so that a power signal is supplied to transmitter 14 after switch 24 is turned ON by the activation signal from decoder/memory circuit 22. Transmitter 14 sends out a homing signal that may be a laser, an RF signal or an IR signal.

Referring to FIGS. 1 and 2, switch 20 is also connected to a power ON delay circuit 26 that in turn is connected to a motion sensor 28. After a preset power on delay time that begins when switch 20 is switched on, power ON delay circuit 26 allows electrical power from battery 16 to be applied to the motion sensor 28. The power on delay time is about two minutes. Any movement of motion sensor 28 after it is activated by electrical power will cause motion sensor 28 to apply power to anti-compromise circuit 30, which will then destroy target designation system 10. Anti-compromise circuit 30 is not harmful to nearby personnel in the event it is accidentally activated.

Still referring to FIGS. 1 and 2, auto-switch 24 also supplies the power signal to the auto-destruct delay circuit 32. After a preset auto-destruct delay time that is about 10 minutes, auto-destruct delay circuit 32 sends a destruct signal to anti-compromise circuit 30, which then destroys the target designation system 10. The 10 minute auto-destruct time delay is an example only. Delay times of 10 to 30 minutes can be useable and can either be preset during manufacture or entered manually when the system is deployed. Note that this procedure can also by applied to the 2 minute power ON delay wherein delays greater than or less than 2 minutes can be set during manufacture and reset in the field, as dictated by tactical needs, prior to deployment of an individual device. However, the Target designation system 10 will automatically be destroyed when the output voltage of battery 16 decays to a (non-adjustable) preset level below which the system will no longer function and its design could become compromised. At this preset level, low voltage switch 17 will automatically activate applying the remaining potential of battery 16 to initiate the anti-compromise device. The preset low voltage level may, for example, be from 10–20 VDC.

The following is a description of target designation system 10 operation when it is placed in an operational mode.

Target designation system 10 is put in an operational mode by placing it on or adjacent to a possible target, such as a bridge, highway, railroad track or radar installation (not shown), or other high value structures such as command and control centers or those sheltering personnel of high political or technical value, which are to be destroyed. Placement of a target designation system 10 should be identified in tactical operational documents by serial number and target location. Target designation system 10 is placed where there is a clear view of the sky and then activated by turning on switch 20 to apply power to receiver 12, decoder/memory circuit 22 and power ON delay circuit 26. After the power ON delay has elapsed, power is applied to motion sensor 28. Nothing further happens until either the low voltage switch 17 is activated or receiver 12 intercepts a encoded RF signal on a preset frequency from an attack aircraft (not shown).

At this time it should be noted that when a user turns manual switch 20 to the ON position, target designation system 10 is placed in automatic mode of operation. Switch 20 when turned on connects battery 16 to receiver 12 activating receiver 12 which listens for an encoded RF carrier signal transmitted at a preset frequency from a transmitter on board the attack aircraft. The manual switch 20 functions only to activate receiver 12 and switch 20 can be turned ON when the system is deployed by a military specialist hours, days or even weeks in advance of an attack. The military specialist who positions the target designation system by the target and then activates switch 20 will then have sufficient time to leave the target area without the risk of personal injury from attack aircraft.

When an encoded RF carrier signal at a preset frequency is received by receiver 12, receiver 12 will provide an electrical equivalent signal of the encoded RF signal to a decoder/memory circuit 22 for decoding. The decoder/memory circuit 22 then analyzes the data pattern encoded on the RF carrier signal. Stored in memory of the decoder/memory circuit 22 is an activation data pattern, which may be, for example a digital data pattern containing ones and zeros. The decoder/memory circuit 22 compares the data pattern of the decoded RF equivalent electrical signal with the data pattern for command words stored in its memory. When the data patterns are identical, decoder/memory circuit 22 provides an electrical activation signal to auto switch 24 which may be, for example, a digital signal at the logic one state. Activation of auto switch, 24 connects battery 18 to transmitter 14 and auto-destruct delay circuit 32. When the transmitter 14 is connected to battery 18, transmitter 14 will start transmitting the homing signal and will continue transmission of the homing signal. The homing signal guides a missile or a smart bomb to its location or to the location of the target it is illuminating. The missile or smart bomb upon reaching the target will destroy the target along with the target designation system 10 or the target designation system 10 will destroy itself at the end of the auto-destruct delay time period or upon activation of battery low voltage activation switch 17, which ever occurs first.

A second encoded RF signal at the preset frequency can be transmitted to target designation system 10 which includes a data pattern for deactivating the auto switch 24. This signal is then decoded by decoder memory circuit 22 and the data pattern from the signal is compared with a de-activation data pattern stored in the memory of decoder/memory circuit 22. When the data patterns are identical an electrical de-activation signal is supplied to auto switch 24 which turns off the auto switch 24. When auto switch 24 is turned off, battery 18 is disconnected from transmitter 14 which causes transmitter 14 to stop transmitting the homing signal. At this point in time, the auto-destruct delay circuit 32 is de-activated.

The homing signal is generally a laser signal but may also be a radio frequency or other appropriate signal which would guide a smart bomb to the target. The process of turning on the homing signal and then subsequently turning off the homing signal can be repeated as long as batteries 16 and 18 remain charged.

When the homing signal is a laser signal, the laser signal may serve as the guidance signal and hence the smart bomb's target, or the laser signal may be reflected from the target directly to the smart bomb to guide the smart bomb to the target.

Target designation system 10 includes a push-to-test switch 19 which has its input connected to battery 16 and its output connected to transmitter 14. Push-to-test switch 19 is an essential component of target designation system 10 when target designation system 10 is configured to transmit a laser signal from the target to a weapons system. When a military specialist deploys target designation system 10 at a target site, the specialist can depress push-to-test switch 10 to connect battery 16 to transmitter 14 providing electrical power to transmitter 14 which turns ON transmitter 14. With push-to-test switch depressed, the military specialist can move target designation system 10 until the laser beam is aligned with the target. When the laser beam from transmitter 14 of target designation system 10 is in alignment with the target, the military specialist releases the push-to-test 19. Manual switch 20 is then turned ON by the military specialist activating target designation system 10.

When a radio frequency signal is used to guide a weapons system'such as a missile or smart bomb to the target, the transmitter 14 transmits the RF signal. Thus, the target designation system 10 and its transmitter become the target, which requires that system 10 be placed on the target or in close proximity to the target so that the weapons system destroys the target. When a laser signal is used to guide a smart bomb to the target, the target designation system 10 can be placed at a remote distance from the target as long as there is a clear line of sight between target designation'system 10 and the target. The homing signal may be encoded with the serial number of target designation system 10 to identify the target being illuminated by comparing the serial number with target designation systems deployment records carried aboard the attack aircraft. This feature also applies to laser transmissions.

When transmitter 14 includes a laser source, transmitter 14 generally include a window 34 where the transmitted laser signal is emitted. Window 34 is arranged so that it faces the target. In this case, target designation system 10 need not be placed directly on the target, but merely within a distance sufficient such that a reflected laser signal will provide guidance for a laser guided smart bomb (not shown). Alternatively, transmitter 14 may have an internal reflective surface (not shown), which reflects an omni-directional homing signal through window 34, in which the target designation system: becomes the target.

Because of the auto-destruct delay circuit 32, transmitter 14 operates for a maximum time equal to the auto-destruct delay time during which ordnance should be delivered to the target for its destruction. If target designation system 10 is not destroyed by direct impact or by movement of motion sensor 28 from the blast of the ordnance, it will be destroyed by automatic activation of anti-compromise circuit 30 at the end of the auto-destruct delay time. Target designation system 10 is destroyed in this manner to prevent it from being compromised by target defenders. The auto-destruct delay can be reset if receiver 12 intercepts a correctly coded signal to turn OFF transmitter 14 and auto-destruct delay circuit 32 before the auto-destruct delay time has elapsed. Transmitter 14 can be activated again if a new coded signal is received by target designation system 10.

From the foregoing, it may readily be seen that the present invention comprises a new, unique and exceedingly useful target designation system which constitutes a considerable improvement over the known prior art. Obviously many modifications of the present invention are possible in light of the above teachings. It is therefore to be understand that within the scope of the appended claims the invention may be practiced otherwise than as specifically described.

What is claimed is:

1. A target designation system designating a target for destruction comprising:
    a first power source for providing a first electrical power signal;
    a manual switch connected to said first power source, said manual switch being turned on by a user of said target designation system;
    a receiver connected to said manual switch, said receiver being activated by the first power signal from said first power source when said manual switch is turned on, said receiver when activated being adapted to receive an encoded RF signal at a preset frequency, said receiver providing an electrical equivalent encoded signal of said encoded RF signal whenever said receiver receives said encoded RF signal at said preset frequency;
    a decoder circuit having a memory, said memory having activation and deactivation data stored therein, said decoder circuit being connected to said receiver to receive and then decode said electrical equivalent encoded signal provided by said receiver, said decoder circuit providing a switch activation signal whenever decoded data contained in said electrical equivalent encoded signal is equivalent to said activation data stored in said memory, said decoder circuit providing a switch deactivation signal whenever said decoded data contained in said electrical equivalent encoded signal is equivalent to said deactivation data stored in said memory;
    a second power source for providing a second electrical power signal; an auto switch connected to said second power source and said decoder circuit, said auto switch being turned on by said switch activation signal, and said auto switch being turned off by said switch deactivation signal;
    a transmitter connected to said auto switch, said transmitter being activated by the second power signal from said second power source when said auto switch is turned on by said switch activation signal;
    said transmitter transmitting a laser homing signal to said target, said laser homing signal being reflected from said target to a remotely guided weapons system allowing said remotely guided weapons system to track and locate said target designation system and destroy said target;
    a push-to-test switch connected to said first power source and said transmitter, said push-to-test switch when depressed by said user providing said first electrical power signal to said transmitter activating said transmitter allowing for an alignment by said user of said laser homing signal with said target, said push-to-test switch being released by said user when said laser homing signal is aligned with said target.

2. The target designation system of claim 1 wherein said first power source and said second power source each comprise a direct current voltage battery.

3. The target designation system of claim 1 wherein said decoder circuit is connected to said first power source, said decoder circuit being activated when said user turns on said manual switch.

4. The target designation system of claim 1 wherein said switch deactivation signal provided by said auto switch deactivates said transmitter, wherein said transmitter stops transmitting said laser homing signal when said transmitter is deactivated.

5. The target designation system of claim 1 further comprising:
    an auto-destruct delay circuit connected to said auto switch, said auto-destruct delay circuit being activated by said second power signal when said auto-switch is turned on, said auto-destruct delay circuit generating a destruct signal after a preset auto-destruct delay time period; and
    an anti-comprise device connected to said auto-destruct delay circuit to receive said destruct signal, said anti-comprise device, responsive to said destruct signal, destroying said target designation system.

6. The target designation system of claim 5 further comprising a low voltage switch connected between said first power source and said anti-compromise device.

7. The target designation system of claim 1 further comprising:
    a power on delay circuit connected to said manual switch, said power on delay circuit receiving the first power signal from said first power source when said manual switch is turned on;
    a motion sensor connected to said power on delay circuit to receive the first power signal from said power on delay circuit after a preset power on delay time, said motion sensor being activated by the first power signal, said motion sensor when activated generating a destruct signal upon sensing motion of said target designation system; and
    an anti-comprise device connected to said motion sensor to receive said destruct signal, said anti-comprise device, responsive to said destruct signal, destroying said target designation system.

8. The target designation system of claim 7 further comprising a low voltage switch connected between said first power source and said anti-compromise device.

9. The target designation system of claim 1 wherein said transmitter includes a window which emits said laser homing signal.

10. The target designation system of claim 1 wherein said switch deactivation signal provided by an auto switch included within said target designation system deactivates said transmitter, wherein said transmitter stops transmitting said laser homing signal when said transmitter is deactivated.

11. A target designation system comprising:
- a first power source for providing a first electrical power signal;
- a manual switch connected to said first power source, said manual switch being turned on by a user of said target designation system;
- a receiver connected to said manual switch, said receiver being activated by the first power signal from said first power source when said manual switch is turned on, said receiver when activated being adapted to receive an encoded RF signal at a preset frequency, said receiver providing an electrical equivalent encoded signal of said encoded RF signal whenever said receiver receives said encoded RF signal at said preset frequency;
- a decoder circuit having a memory, said memory having activation and deactivation data stored therein, said decoder circuit being connected to said receiver to receive and then decode said electrical equivalent encoded signal provided by said receiver, said decoder circuit providing a switch activation signal whenever decoded data contained in said electrical equivalent encoded signal is equivalent to said activation data stored in said memory, said decoder circuit providing a switch deactivation signal whenever said decoded data contained in said electrical equivalent encoded signal is equivalent to said deactivation data stored in said memory;
- a second power source for providing a second electrical power signal;
- an auto switch connected to said second power source and said decoder circuit, said auto switch being turned on by said switch activation signal, and said auto switch being turned off by said switch deactivation signal;
- a transmitter connected to said auto switch, said transmitter being activated by the second power signal from said second power source when said auto switch is turned on by said switch activation signal;
- said transmitter transmitting a laser homing signal to said target, said laser homing signal being reflected from said target to a remotely guided weapons system allowing said remotely guided weapons system to track and locate said target designation system and destroy said target;
- a push-to-test switch connected to said first power source and said transmitter, said push-to-test switch when depressed by said user providing said first electrical power signal to said transmitter activating said transmitter allowing for an alignment by said user of said laser homing signal with said target, said push-to-test switch being released by said user when said laser homing signal is aligned with said target
- an auto-destruct delay circuit connected to said auto switch, said auto-destruct delay circuit being activated by said second power signal when said auto-switch is turned on, said auto-destruct delay circuit generating a first destruct signal after a preset auto-destruct delay time period;
- a power on delay circuit connected to said manual switch, said power on delay circuit receiving the first power signal from said first power source when said manual switch is turned on;
- a motion sensor connected to said power on delay circuit to receive the first power signal from said power on delay circuit after a preset power on delay time, said motion sensor being activated by the first power signal, said motion sensor when activated generating a second destruct signal upon sensing motion of said target designation system;
- an anti-comprise device connected to said auto-destruct delay circuit and said motion sensor to receive said first destruct signal and said second destruct signal, said anti-comprise device, responsive to each of said first and said second destruct signals, destroying said target designation system.

12. The target designation system of claim 11 wherein said first power source and said second power source each comprise a direct current voltage battery.

13. The target designation system of claim 11 wherein said decoder circuit is connected to said first power source, said decoder circuit being activated when said user turns on said manual switch.

14. The target designation system of claim 11 wherein said switch deactivation signal provided by said auto switch deactivates said transmitter, wherein said transmitter stops transmitting said laser homing signal when said transmitter is deactivated.

15. The target designation system of claim 11 further comprising a low voltage switch connected between said first power source and said anti-compromise device, said low voltage switch providing a third destruct signal to said anti-compromise device when said first power source drops below a preset voltage level, said anti-comprise device, responsive to each of said third destruct signals, destroying said target designation system.

16. The target designation system of claim 11 wherein said transmitter includes a window which emits said laser homing signal.

17. A method for destroying a target by remotely guided ordinance comprising the steps of:
- (a) positioning a target designation system in proximity to said target to be destroyed;
- (b) aligning said target designation system with said target by depressing a push-to-test switch which activates a transmitter included in said target designation system;
- (c) transmitting a laser homing signal from said transmitter to said target when said push-to-test switch is depressed to insure alignment of said target designation system with said target;
- (d) activating said target designation system by turning on a manual switch included in said target designation system;
- (e) receiving an encoded RF signal at a preset frequency after said target designation system is activated, said target designation system including a receiver which is set at said preset frequency to receive said encoded RF signal;
- (f) decoding said encoded RF signal to provide an activation signal and a deactivation signal, said target designation system including a decoder circuit which decodes said encoded RF signal to provide said activation signal and said deactivation signal;
- (g) transmitting said laser homing signal from said target to said remotely guided ordinance allowing said remotely guided ordinance to track and then destroy said target, said target designation system including said transmitter for transmitting said laser homing signal to said target wherein said laser homing signal is reflected from said target to said remotely guided ordinance, said transmitter starting transmission of said laser homing signal in response to said activation signal and ceasing transmission of said laser homing signal in response to said deactivation signal; and (h) destroying said target designation system after a preset auto-destruct delay time period, said preset auto-destruct delay time period being initiated by said activation signal from said decoder circuit, said target designation system including an auto destruct delay circuit which generates a destruct signal after said preset auto-destruct delay time period expires and an anti-compromise device which receives said destruct signal and destroys said target designation system, responsive to said destruct signal from said auto destruct delay circuit.

18. The method of claim 17 further comprising the step of destroying said target designation system whenever a motion sensor within said target designation system detects movement of said target designation system, said motion sensor providing another destruct signal to said anti-compromise which then destroys said target designation system.

19. The method of claim 17 wherein said preset auto-destruct delay time period expires after approximately ten minutes.

20. The method of claim 17 wherein said transmitter includes a window which emits said laser homing signal.

\* \* \* \* \*